United States Patent Office 3,563,911
Patented Feb. 16, 1971

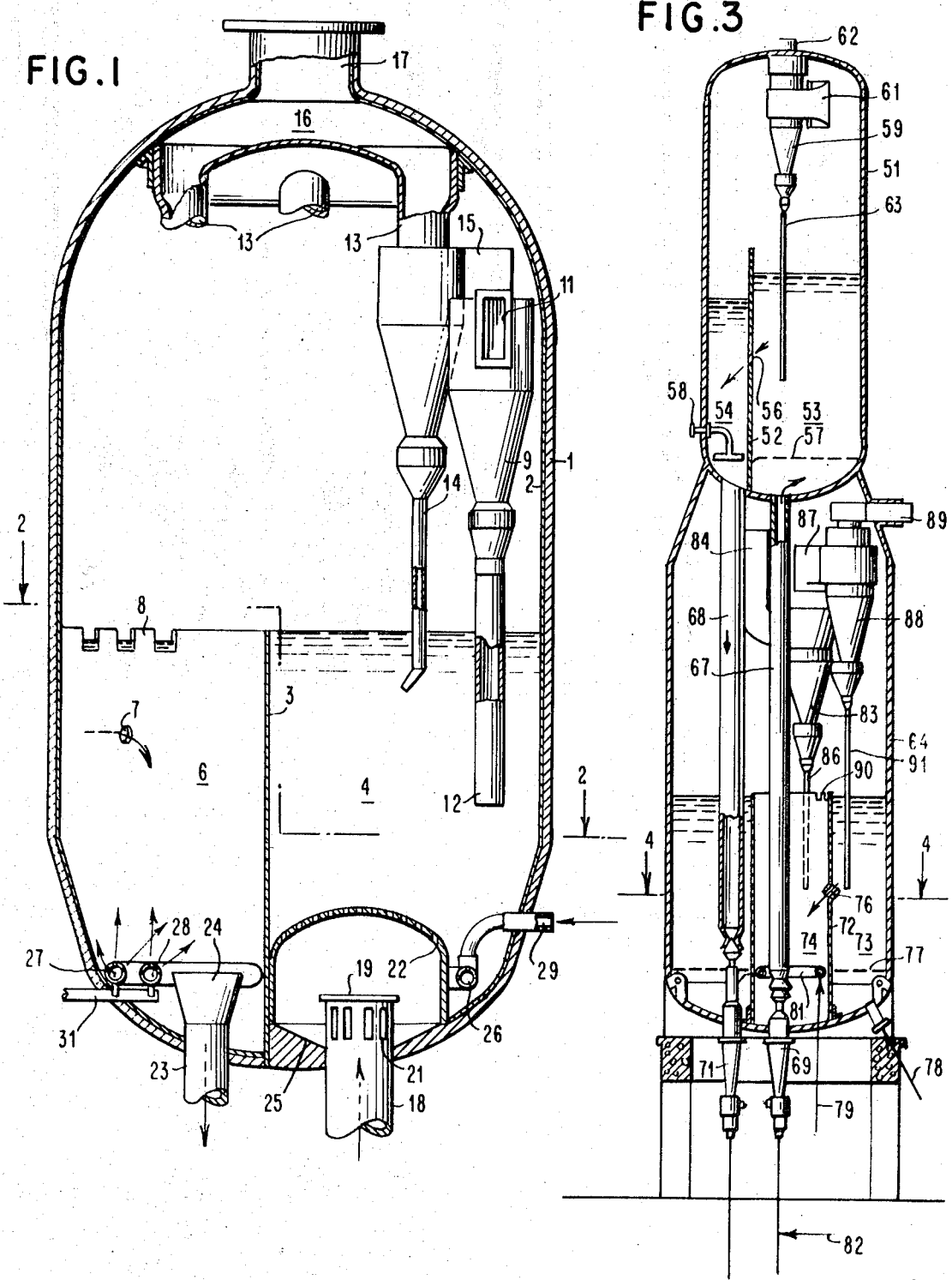

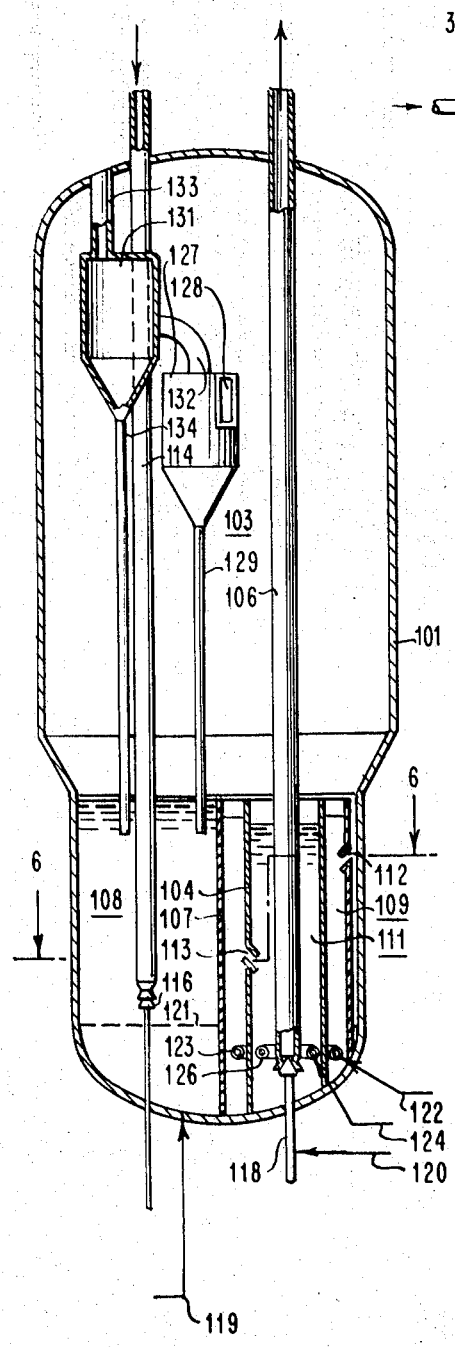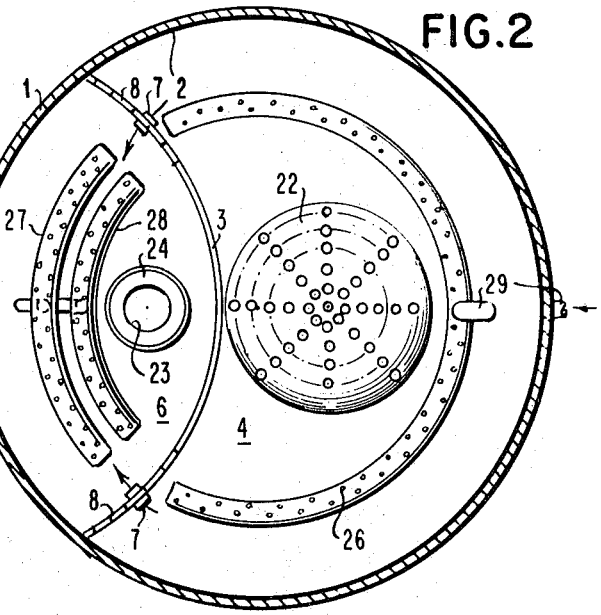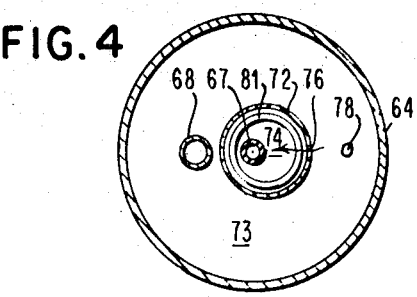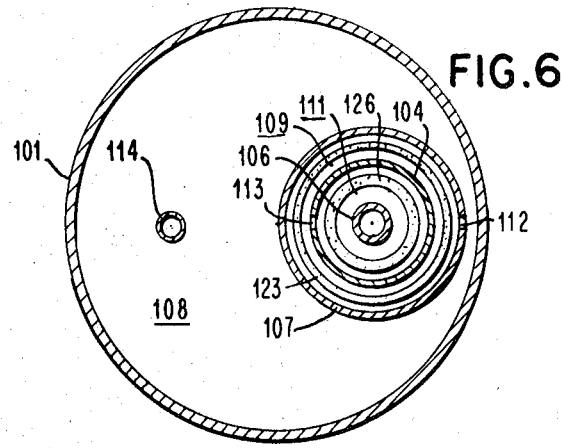

3,563,911
STAGED FLUIDIZED CATALYST REGENERATION
PROCESS
Robert W. Pfeiffer, Bronxville, N.Y., and Luther W. Garrett, Jr., Allison Park, Pa., assignors to Pullman Incorporated, Chicago, Ill., a corporation of Delaware
Continuation-in-part of application Ser. No. 528,594, Feb. 18, 1966, now Patent No. 3,421,884, which is a division of application Ser. No. 416,571, Dec. 7, 1964, now Patent No. 3,276,858, Oct. 4, 1966. This application Dec. 26, 1968, Ser. No. 787,148
Int. Cl. B01j 11/04, 11/68
U.S. Cl. 252—417      5 Claims

ABSTRACT OF THE DISCLOSURE

A multi-staged method of removing carbonaceous deposits from particulate, fluidized material is disclosed. Said method is particularly applicable to the regeneration of cracking catalysts to low levels of carbon.

---

This application is a continuation-in-part of pending application S.N. 528,594 filed Feb. 18, 1966, now U.S. Pat. 3,421,884 issued Jan. 14, 1969 which is a division of application S.N. 416,571 filed Dec. 7, 1964 now U.S. Pat. 3,276,858 issued Oct. 4, 1966.

The present invention relates to the staged reaction of fluidized solid material and particularly to a staged process for the oxidative removal of carbonaceous deposits from particulate material.

One specific embodiment pertains to the staged regeneration of spent fluidized catalytic cracking catalysts.

There are a number of continuous cyclical processes which employ fluidized solids techniques wherein the reaction causes carbonaceous materials to be deposited on the solids in the reaction zone, said solids being conveyed during course of the cycle to another zone where said carbon deposits are at least partially removed by combustion in an oxygen containing medium. The solids from the latter zone are subsequently withdrawn and reintroduced in whole or in part to the reaction zone. Among such processes are fluid coking, fluid hydrofoaming, fluid catalytic cracking, etc.

One of the more important processes of this nature is the fluid catalytic cracking process for the conversion of relatively high-boiling hydrocarbons to lighter hydrocarbons boiling in the gasoline range. The hydrocarbon feed is contacted in one or more reaction-cracking zones with the particulate cracking catalyst maintained in a fluidized state under conditions suitable for the conversion of hydrocarbons.

The gaseous effluent from the reaction zone is passed to a product recovery zone while the catalyst is generally passed to a stripping zone for removal of strippable hydrocarbons from the particles. The stripped catalyst is subsequently introduced into a fluidized regeneration zone wherein non-strippable carbonaceous material is contacted with an oxygen-containing gas, e.g., air, under conditions such that a major portion of the carbon on the catalyst particles is removed therefrom by combustion. The hot regenerated catalyst is subsequently introduced to the cracking zone for completion of the cyclic process.

Provisions are made for recovering and returning catalyst entrained in the gaseous effluents from the reaction and regeneration zones. This is usually carried out by passing the respective effluents through cyclones located in the disengaging spaces of the aforementioned zones; however, other feasible means for recovery of catalyst can equally well be employed, either inside or outside the zones. Although the efficiency of cyclones and other such equipment for the recovery of the solid catalyst particles are usually very high, some catalyst is always lost from the system, and it is necessary to add fresh "make-up" catalyst to maintain the desired total catalyst inventory at a constant level, and to maintain a high equilibrium activity of the catalyst. Typical daily make-up catalyst rates are between about 0.5 to about 2.0 percent of total catalyst inventory in the system, with the average being about one percent of inventory per day. The major portion of the catalyst losses occur from the regeneration zone, but such losses may be less than the replacement rate, which is required to maintain the desired high equilibrium activities in the system, and to this end it may also be required to replace a portion of the catalyst inventory with fresh catalyst. It is especially desirable to maintain high equilibirum activities when employing the highly active molecular sieve type of cracking catalysts.

Since the aforementioned sieve catalysts are relatively expensive, it is evident that operations requiring larger inventories and therefore larger catalyst make-up rates tend to be less economically attractive and vica versa. As most catalyst losses occur in the regeneration zone, which generally is contained within the largest vessel of the system, it is the present practice to employ operating conditions in the regenerator that favor high carbon burning rates, thereby permitting relatively low regenerator inventories. Such operating conditions include high bed temperatures, usually in a region of above 1150° F. and preferably higher than 1175° F., e.g. between about 1200 and 1250° F. Since the carbon burning rate is greatly reduced at low levels of carbon on the regenerated catalyst, present practice usually limits the minimum attainable carbon level to about 0.2 weight percent, and more usually to values in the 0.3–0.4 percent region.

It is known, however, that the level of carbon content on the regenerated catalyst has a great influence on the conversion and product distribution obtained in the reaction zone, especially with short contact time dilute phase cracking reactors. For instance, at constant operating conditions and constant coke production, a downward change in weight percent carbon on regenerated sieve catalyst from about 0.35 to about 0.1 will typically result in an increase in conversion of about 2.5 volume percent, the increase in converison being obtained at the expense of decreased production of less valuable heavy fuel oil. Similarly, a decrease in carbon on regenerated sieve catalyst from 0.2 weight percent to about 0.05 weight percent will improve conversion about 2 volume percent or more and improve gasoline yield by about 1.4 volume percent or more.

As mentioned above, carbon burning rates are greatly affected by the level of percent carbon on regenerated catalyst, and low carbon levels will promote the production of more valuable products on the reaction side. However, such low levels will, employing present methods of regeneration, result in huge and costly vessels, in the exposure of the catalyst to high temperatures for long periods of time which is known to cause deactivation and in large catalyst losses from the system due to increased inventories.

It is therefore an object of the present invention to provide an improved method of removing carbonaceous deposits from solid material of fluidizable particle size by combustion.

Another object is to provide a method of regenerating hydrocarbon conversion catalysts to low carbon levels without requiring extremely large catalyst inventories and without causing excessive catalyst losses from the system. Still another object of the present invention is to provide a method of regeneration of hydrocarbon conversion catalysts which will result in improved yields and product distributions. Yet another object is to provide a method of regenerating hydrocarbon conversion catalyst to low carbon levels at lower average temperature levels than heretofore possible. Other objects will be apparent from the following description and disclosure.

In accordance with the present invention, the aforementioned objects are accomplished by introducing particulate material of fluidizable particle size having carbonaceous material deposited thereon into a combustion zone having at least two separate dense beds of fluidized particulate material and a common dilute phase superimposed thereabove, introducing a first oxygen-containing gas to a first one of said beds, removing by combustion a portion of said carbonaceous deposits from the particulate material in said first bed, introducing particulate material from the first bed to a second such bed, introducing a second oxygen-containing gas to said second bed, and removing therein by combustion a further portion of said carbonaceous deposits from the particulate material.

It is preferred that a major portion of the carbonaceous deposits be removed by oxidation in the stages prior to the last stage, and most preferably the major portion amounts to at least 65% of the total removal.

It has been found that when operations are carried out in the manner described above, a surprising and unexpected decrease is accomplished in the catalyst inventory required to achieve a desired low level of remaining carbonaceous deposits on the particulate material leaving the combustion zone. In a continuous-flow fluidized reactor, e.g. the aforementioned combustion zone, particles which enter the reactor are rapidly and intimately mixed together with those in the bed. The out-flowing stream of solids thus contain particles which have been undergoing combustion reaction for varying lengths of time, ranging from almost zero to almost infinity, and thus inherently have a wide distribution of concentration of carbon deposits. A large portion of the out-flowing solids will have had an actual residence time in the bed which is less than the average residence time calculable from bed inventory and the solids flow rate, and will have had a lesser percentage of deposits removed by combustion than the remaining portion of out-flowing solids, said remaining portion having spent in actual time in the bed longer than the average residence time. With the provision of additional combustion stages, the spread of the actual residence time distributions in the total vessel becomes successively narrower, the limiting case being one where an infinite number of beds are employed, resulting in the actual residence times of each of the individual particles being equal to the total average residence time. An important additional benefit derived from staged operation is that a product of more uniform quality is obtained.

Generally, in order to obtain a solids product of desired quality, it is necessary to provide longer average residence times with a single stage, than is necessary when two or more stages are employed, especially when isothermal temperature conditions are employed in the respective stages. However, the combustion of carbonaceous material with oxygen is a heat-generating reaction, which causes the temperature of each prior stage to be lower than each successive one. This in turn decreases the carbon burning rates in the prior stages, thus tending to counteract the improvement attributable to the better residence time distribution obtained through staging. It has been found that the invention is generally most advantageous when it is desired that the solids are to be withdrawn from the combustion zone having less than about 0.25 weight percent carbonaceous material remaining thereon, and that drastic reductions are achieved, in the total bed inventories, combustion zone volumes and total residence times, when the residual carbon contents are reduced to below about 0.10 weight percent, e.g. between about 0.05 and about 0.10 weight percent. However, the aforementioned upper limit is not absolute and will vary somewhat with a number of factors, such as the combination of other operating conditions employed, e.g. a change in the difference in temperature between the in-flowing and out-flowing solids will tend to change said upper broad limit. Other such factors would be a change in the difference in concentration of deposits between the in-flowing and out-flowing solids, or a change in superficial gas velocity in the bed. Still another factor is that the efficiency of a given combustion zone depends upon its design configuration, i.e. the amount of carbon burned per unit volume of dense bed will vary between combustion zones of different designs, all other operating conditions being equal.

The invention is particularly advantageous when applied to regeneration of solids which are sensitive to prolonged exposures at high temperatures, e.g. hydrocarbon conversion catalysts including cracking catalysts, in that a major portion of the regeneration is carried out in the first stage or stages at relatively mild conditions and only the final regeneration step is carried out at the highest temperature level. The method of the invention can be employed to improve the quality i.e. carbon level and equilibrium activity of the hydrocarbon conversion catalyst, or if the quality is satisfactory, to reduce the regeneration zone hold-up or to achieve a combination of the above.

When applied to the regeneration of cracking catalysts it is preferred to employ as high a temperature as possible in the regeneration zone without causing appreciable deactivation of the catalyst or damage to the vessel and its appurtenant equipment, such as cyclones, etc. Such preferred temperature conditions include a range in the final regeneration stage from about 1125° F. to about 1350° F. and most preferably between about 1150° F. and about 1325° F. In the first stage it is preferred that temperatures above 1050° F. be employed and most advantageously a range about 1100° F. and about 1275° F. is used. The oxygen containing gases can either be air, oxygen or oxygen-enriched air. Provision should be made for controlling at least a portion of the gas supply to the regeneration zone responsive to rapid increases in flue gas outlet temperatures indicative of uncontrolled after-burning in the upper portion of the regeneration zone. In general, it is desirable to operate the regeneration zone with a small amount of after-burning occurring therein, and the oxygen-containing gas is usually supplied at rates that will result in about 0.1 to about 1.0 mole percent of oxygen in the flue gas, and up to about 125° F. difference between the flue gas temperature and that of the last bed. The inherently larger oxygen concentration in the gas immediately leaving the bed in case of controlled after burning causes the carbon burning rates in the bed to be enhanced. The exothermic after-burning reaction also serves to provide additional heat to the dense beds through the return of entrained catalyst recovered in the cyclones, such entrained catalyst having been brought to a higher temperature in the dilute phase above the beds. The oxygen-containing gases are supplied to the respective stages in amounts commensurate with the desired amount of combustion to occur therein, and are usually preheated, e.g. by prior compression, to between about 200 and about 500° F. It is not necessary that the portions be preheated to the same temperature nor that the gases have the same composition, e.g. the gas fed to one stage can be air, while the gas to another can be oxygen-enriched air or even oxygen, etc. Depending upon the location of the regeneration zone in relation to the other vessels in the system, it may be necessary to transport the catalyst from a lower elevation into the first regeneration stage. Advantageously, at least part of the gas to be fed to said first bed is employed as transport medium and the resulting suspension of the gas and catalyst is introduced to said first bed usually within a lower portion thereof. However, the catalyst can also be added to the bed by discharge of the suspension thereabove.

The invention is preferably carried out in a generally cylindrical vessel, provided in the lower portion thereof with one or more upwardly extending vertical baffles of sufficient height to maintain the required inventories of the respective beds. These baffles can be of any suitable design, e.g. plates dividing the vessel into compartments having cross-sectional areas either in the shape of sectors or segments. Preferably, such plates are arched. Other suitable designs include one or more cylindrical inner shells, their vertical axes not necessarily coinciding with each other or with that of the vessel itself. Communication between the beds separated by the aforementioned baffles is achieved either by overflow over the top portions of said baffles, or preferably by provisions of discharge openings in the baffles, or by a combination of both. Care should be taken to space the solids inlets and outlets within a bed at a sufficient distance to ensure a proper mixing. To this end, the upper portion of the baffle may be provided with one or more sections of weirs for passage of solids thereover. A common dilute phase is maintained in the upper portion of the vessel, said portion preferably housig equipment, such as cyclones, for the recovery of solid particles entrained in the combustion gases leaving the beds. To minimize entrainment rates when the superficial velocities are relatively high in the lower portion, the upper portion of the vessel may be of a larger diameter than the lower portion. Generally, the superficial velocities are maintained in the lower portion of the vessel at above about 1 foot per second based on inlet gas composition and temperature and pressure conditions within the zone, and preferably between about 1.25 and 6 feet per second to improve the burning rates. Most preferably, the velocities are maintained in a range from about 2 feet to about 4.5 feet per second. In this latter range it is possible to achieve very high carbon burning rates without excessive reactor bed heights.

Having thus described the invention in general terms, reference is now made to the schematic drawings in order to provide a better understanding of the present invention.

It is to be understood that the drawings are only shown in such details as is necessary for an understanding of the invention, and that various items such as valves, bleed and dispersion steam lines, instrumentation, and other process equipment and control means have been omitted therefrom for the sake of simplicity.

FIG. 1 is a longitudinal cross section of an apparatus suitable for carrying out the method of the invention said apparatus including baffle means for providing at least two dense beds of fluidized material.

FIG. 2 is a plan section taken on line 2—2 of FIG. 1.

FIG. 3 shows in longitudinal cross sectional view a fluid catalystic cracking installation having a lower regeneration zone, which is provided with two separate, dense beds for carrying out two-stage catalyst regeneration according to the method of the invention.

FIG. 4 is a plan section taken on the line 4—4 of FIG. 3.

FIG. 5 depicts in longitudinal cross-section a regeneration zone similar to the one of FIGS. 3 and 4 but containing three separated dense beds of catalyst.

FIG. 6 is a plan section taken along the line 6—6 of FIG. 5.

Referring now to FIGS. 1 and 2, the combustion zone is contained within a cylindrical, closed vessel 1, equipped with refractory lining 2. The lower portion of the vessel is provided with arched baffle 3 dividing said lower portion into sections 4 and 6. The baffle is provided with weirs 8, located away from solids conduits 18 and 23. Spaced openings 7 are located in the baffle to provide communication between the larger section 4 and the smaller section 6. The upper portion of vessel 1 is equipped with several sets of cyclones, one such set being shown in FIG. 1. Primary cyclone 9, having inlet 11 and dipleg 12 for return of solids to section 4 communicates via conduit 15 with secondary cyclone 20, which has a flue gas outlet line 13 and dipleg 14 for return of additional recovered solids to section 4. Flue gas outlet line 13 is in communication with plenum chamber 16 and conduit 17 leading from said plenum chamber to the stack, not shown. Solids inlet line 18, which is capped with cap 19 and provided with discharge slots 21 enters through the bottom of vessel 1 below the perforated grid structure 22 within section 4. A conical baffle arrangement 25 encloses said conduit within grid structure 22. Solids outlet line 23 having a flared upper portion 24 is situated in the bottom portion of section 6 of vessel 1. Air is provided to air distributors 26, 27, and 28 by means of air supply lines 29 and 31.

In operation of the above described apparatus, solids having carbonaceous material deposited thereon enters below and passes through grid 22 into a first bed of fluidized solids maintained in section 4, and are contacted there with the air distributed by air distributor 26. The air serves as a fluidizing medium as well as combustion medium and is fed in an amount at least sufficient to achieve the desired removal of deposits from the solids in the bed. Such treated material is subsequently withdrawn to a second fluidized bed of solids contained within section 6 through slots 7 and, depending upon the bed level in section 4, sometimes also by flow over the weirs 8. In section 6 it is contacted with a sufficient quantity of air to achieve fluidization as well as the desired level of residual deposits on the solids leaving the combustion zone via conduit 23. The combustion gases leaving the beds contained within sections 4 and 6 carry entrained solids, which are separated from the flue gas in sets of cyclones spaced within the upper portion of the combustion zone. The solids are returned to the beds via diplegs 14 and 12.

Referring now to FIGS. 3 and 4, an upper reaction vessel 51 is provided, having a vertical baffle 52, which divides the vessel into a cracking zone 53 and a stripping zone 54. Communications between said zones are provided by means of openings 56. The lower portion of zone 53 is equipped with a grid 57 and the lower portion of zone 54 with means for introducing stripping steam 58. The upper portion of the vessel is outfitted with at least one cyclone 59, having inlet means 61, a vapor outlet 62 and a solids return dipleg 63. The upper vessel 51 is in communication with the lower regeneration vessel 64, which is lined with refractory, not shown, said communications being provided by means of riser 67 communicating the lower portions of vessel 64 and cracking zone 53 and also by means of spent catalyst standpipe 68, which transports solids from stripping zone 54 to the lower portion of vessel 64. Flows in said riser and standpipe are controlled respectively by hollow plug valve assembly 69 and solid plug valve 71. The lower vessel 64 is provided with an inner, cylindrical shell 72 therewithin. Said cylindrical shell divides the lower portion of vessel 64 into two sections an outer one 73 and an inner one 74. Communication is provided therebetween by means of opening 76 and also by means of over flow over weirs 90. Grid 77 is located at the lower portion of section 73 and above air inlet means 78. Air is fed to section 74 by means of line 79 and distributed there by means of ring 81. Hydrocarbon feed to the cracking zone is introduced in line 82 and passes through hollow plug valve 69 into riser 67. The upper portion of the regenerator is equipped with several sets of cyclones, one such set being shown in FIG. 3. Primary cyclone 83, having inlet 84 and solids return dipleg 86 communicates with secondary cyclone 88 via conduit 87. Flue gas is discharged from the regenerator via line 89 and solids are returned by means of dipleg 91.

In operation of this cracking installation, hot regenerated catalyst withdrawn from a bed maintained in section 74 of the regenerator 64 is contacted in riser 67 with hydrocarbon feed from line 82, and the resulting hydrocarbon-catalyst suspension flows upwards into the reactor 53 containing a bed of catalyst, where the hydrocarbons are cracked to the desired conversion. The cracked hydrocarbon vapors are sent to recovery in line 62, and as previously described, the entrained catalyst recovered in cyclone 59 is returned to the reactor by means of dipleg 63. Catalyst is withdrawn from the reaction zone to the stripping zone 54, where "strippable" coke is removed by treatment with steam. The stripped catalyst still having carbon deposits thereon, is then fed through standpipe 68 to a bed maintained in regenerator vessel 64 in section 73 thereof. A portion of the carbon is burnt off from the spent catalyst in said bed by combustion with air which is supplied through line 78 and distributed by grid 77. The amount of air is sufficient to fluidize the catalyst and to burn off the desired amount of carbon from the catalyst. The partially regenerated catalyst is withdrawn through slot 76 and contacted in a second bed in section 74 with a second stream of air under combustion conditions to further regenerate the catalyst. Said second stream of air is fed through line 79 to air distributor ring 81 in a quantity commensurate with the amount of combustion necessary to achieve the desired quality i.e. the final level of percent carbon on regenerated catalyst, and sufficient to support fluidization. Flue gas is withdrawn from secondary cyclone outlet 89 and solids recovered in the cyclones 83 and 88 are returned via diplegs 86 and 91.

FIGS. 5 and 6 depict a regeneration zone similar to the one of FIGS. 3 and 4 but having provisions for an intermediate regeneration stage. It is particularly useful when high superficial gas velocities are employed. Cylindrical, enclosed vessel 101, lined with refractory, not shown, has an upper disengaging space 103 of larger diameter than the lower portion of the vessel, which is provided with a first inner cylindrical shell 104 surrounding riser 106 and a second such shell 107 of larger diameter than and concentric with the first one. Said shells divide the lower portion of vessel 101 into three sections: a first 108, an intermediate 109, and a second 111, communication being provided therebetween by means of slots 112 in shell 107 and 113 in shell 104. The vessel is in communication with a stripping zone (not shown) by means of spent catalyst standpipe, 114, the downward flow of catalyst in said standpipe being controlled by solid plug valve 116. Catalyst riser 106, equipped with hollow plug valve 118 for control of solids flow, extends from section 111 upwards through the regeneration vessel. Air is provided in parallel flow to the three sections 108, 109, and 111 through the respective supply lines 119, 122, and 124, line 119 emptying below grid 121 in space 108, line 122 connected to distributor ring 123 and line 124 to ring 126. Sets of cyclones are provided in the upper portion 103 of the vessel, one such set being shown in FIG. 5. Primary cyclone 127, having inlet 128 and dipleg 129 for return of solids recovered therein, is connected to secondary cyclone 131 by means of conduit 132. The secondary cyclone has a flue gas discharge 133 and a dipleg 134.

The operation of the regenerator of FIG. 5 is very much similar to the one of FIG. 3 in that spent catalyst, introduced through standpipe 114, is partially regenerated in a first fluidized dense bed, maintained in section 108, by means of combustion in air, the latter being provided in line 119 and distributed by grid 121. The catalyst is further regenerated in an intermediate dense bed, maintained in section 109, with air supplied through line 122 and distributed by ring 123. The catalyst is subsequently regenerated to the desired final outlet carbon concentration in a final bed maintained in section 111 and similarly supplied with air through line 124 and ring 126. The regenerated catalyst withdrawn from section 111 is contacted in the riser 106 with hydrocarbon feed entering through line 120 and hollow plug valve 118. All or part of the cracking reaction may take place in the riser and further extensions thereof. Due to the larger diameter of the disengaging space 103, entrainment rates can be maintained at reasonably low levels, which is important when relatively high superficial gas velocities are employed in the dense beds of the regeneration zone. Entrained catalyst is recovered in cyclones 127 and 131 and returned in diplegs 129 and 134, while flue gas is discharged through line 133.

The following examples are presented illustrating and comparing the method of the present invention for the regeneration of cracking catalyst, in any of the systems depicted in the drawings, with a conventional regeneration method. In all cases a commercially available molecular sieve type catalyst is regenerated with air. The catalyst has previously been contacted with a heavy gas oil under cracking conditions in a reactor zone and subsequently been stripped of strippable coke in a stripping zone. The residual coke after stripping contains about 7 weight percent hydrogen.

EXAMPLES 1A AND 1B

Spent catalyst is fed at a rate of 1000 pounds per second to a regeneration zone provided with two separate dense beds. The inlet temperature of the catalyst is about 950° F. and it contains 0.85 weight percent of carbon. The catalyst is regenerated to 0.05 weight percent carbon and its outlet temperature is controlled at 1250° F. Superficial gas velocities are maintained at two levels, 2.5 feet per second in Example 1A and 4.5 feet per second in Example 1B. The concentration of oxygen in the gases leaving the beds are controlled at 0.3 mole percent. The percent carbon removal is varied from 0 to 100 percent in the first bed, basis total carbon removal in the regeneration zone. Tables 1A and 1B summarize the pertinent data of these comparative examples.

Comparisons of the results from the staged operations with those from the conventional single-stage regeneration listed in the last column of Table 1A show that the baffle should be positioned such that at least about 30 weight percent of the total inventory is maintained in the first bed when 2.5 feet per second superficial gas velocities are employed, and that as said percentage is increased the total inventory requirements are decreased and will reach a minimum at about 76.5%. The corresponding total inventory is then only 71% of that of the single stage conventional regeneration process. The first set of columns shows that staging can actually have an adverse effect on total inventory requirements.

Comparisons of the results from operations at 4.5 feet per second gas velocities as presented in Table 1B, show that the effect of the staging and baffle positions are similar, and that baffling becomes more beneficial as the superficial gas velocities are increased from 2.5 to 4.5 feet per second. At the high velocity, the optimum total inventory for the staged-regeneration is only 62% of that of the conventional single stage regeneration process.

TABLE 1A.—TWO-STAGE REGENERATION OF CRACKING CATALYST WITH 0.85% CARBON DEPOSITSn AT 2.5 FEET PER SECOND SUPERFICIAL GAS VELOCITIES

|  | Stage | | Stage | | Stage | | Stage | | Stage | | Stage | |
| --- | --- | --- | --- | --- | --- | --- | --- | --- | --- | --- | --- | --- |
|  | First | Second | First | Second | First | Second | First | Second | First | Second | First | Second |
| Percent carbon removal in stage | 16.7 | 83.3 | 33.3 | 66.7 | 50.0 | 50.0 | 66.7 | 33.3 | 83.3 | 16.7 | 100.0 | |
| Catalyst flow-rate (excluding deposits), lbs./sec | 1,000 | 1,000 | 1,000 | 1,000 | 1,000 | 1,000 | 1,000 | 1,000 | 1,000 | 1,000 | 1,000 | |
| Cayalyst inlet temp., °F | 950 | 1,000 | 950 | 1,050 | 950 | 1,100 | 950 | 1,150 | 950 | 1,200 | 950 | |
| Catalyst outlet temp., °F | 1,000 | 1,250 | 1,050 | 1,250 | 1,100 | 1,250 | 1,150 | 1,250 | 1,200 | 1,250 | 1,250 | |
| Pressure above ved, p.s.i.g | 16.0 | 16.0 | 16.0 | 16.0 | 16.0 | 16.0 | 16.0 | 16.0 | 16.0 | 16.0 | 16.0 | |
| O₂ concentration in gas leaving bed, mole percent | 0.3 | 0.3 | 0.3 | 0.3 | 0.3 | 0.3 | 0.3 | 0.3 | 0.3 | 0.3 | 0.3 | |
| Carbon on catalyst in, wt. percent | 0.85 | 0.72 | 0.85 | 0.58 | 0.85 | 0.45 | 0.85 | 0.32 | 0.85 | 0.18 | 0.85 | |
| Carbon on catalyst out, wt. percent | 0.72 | 0.05 | 0.58 | 0.05 | 0.45 | 0.05 | 0.32 | 0.05 | 0.18 | 0.05 | 0.05 | |
| Invention basis total inventory, wt. percent | 20.6 | 79.4 | 31.2 | 68.8 | 41.9 | 58.1 | 56.3 | 43.7 | 76.5 | 23.5 | 100.0 | |
| Total catalyst inventory, lbs | 571,950 | | 528,270 | | 469,500 | | 415,640 | | 386,780 | | 545,120 | |
| Ratio of total inventories (two stage/one stage) | 1.05 | | 0.97 | | 0.86 | | 0.76 | | 0.71 | | 1.00 | |

TABLE 1B.—TWO-STAGE REGENERATION OF CRACKING CATALYST WITH 0.85% CARBON DEPOSITS AT 4.5 FEET PER SECOND SUPERFICIAL GAS VELOCITIES

|  | Stage | | Stage | | Stage | | Stage | | Stage | | Stage | |
| --- | --- | --- | --- | --- | --- | --- | --- | --- | --- | --- | --- | --- |
|  | First | Second | First | Second | First | Second | First | Second | First | Second | First | Second |
| Percent carbon removal in stage | 16.7 | 83.3 | 33.3 | 66.7 | 50.0 | 50.0 | 66.7 | 33.3 | 83.3 | 16.7 | 100.0 | |
| Cayalyst flow-rate, lbs./sec. (excluding deposits) | 1,000 | 1,000 | 1,000 | 1,000 | 1,000 | 1,000 | 1,000 | 1,000 | 1,000 | 1,000 | 1,000 | |
| Catalyst inlet temp., °F | 950 | 1,000 | 950 | 1,050 | 950 | 1,100 | 950 | 1,150 | 950 | 1,200 | 950 | |
| Catalyst outlet temp., °F | 1,000 | 1,250 | 1,050 | 1,250 | 1,100 | 1,250 | 1,150 | 1,250 | 1,200 | 1,250 | 1,250 | |
| Pressure above bed, p.s.i.g | 16.0 | 16.0 | 16.0 | 16.0 | 16.0 | 16.0 | 16.0 | 16.0 | 16.0 | 16.0 | 16.0 | |
| O₂ concentration in gas leaving bed, mole percent | 0.3 | 0.3 | 0.3 | 0.3 | 0.3 | 0.3 | 0.3 | 0.3 | 0.3 | 0.3 | 0.3 | |
| Carbon on catalyst in, wt. percent | 0.85 | 0.72 | 0.85 | 0.58 | 0.85 | 0.45 | 0.85 | 0.32 | 0.85 | 0.18 | 0.85 | |
| Carbon on cayalyst out, wt. percent | 0.72 | 0.05 | 0.58 | 0.05 | 0.45 | 0.05 | 0.32 | 0.05 | 0.18 | 0.05 | 0.05 | |
| Inventory basis, total inventory, wt. percent | 23.0 | 77.0 | 32.3 | 67.7 | 40.6 | 59.4 | 52.7 | 47.3 | 73.3 | 26.7 | 100.0 | |
| Total catalyst inventory lbs | 435,090 | | 395,470 | | 338,200 | | 283,150 | | 250,500 | | 401,800 | |
| Ratio of total inventories (two stage/one stage) | 1.08 | | 0.98 | | 0.84 | | 0.71 | | 0.62 | | 1.00 | |

EXAMPLES 2A AND 2B

In these comparative examples the conditions, number of stages and the incremental amount of carbon to be removed from the catalyst by the regeneration are identical with those in Examples 1A and 1B with the exception that the actual concentrations of carbon on catalysts are higher, the inlet concentration being 0.90 weight percent and the outlet concentration 0.10 weight percent. The pertinent data are summarized in Tables 2A and 2B.

The results from these comparative examples show the same trends as were evident in Examples 1A and 1B. However, due to the higher level of carbon on regenerated catalyst from the second stage, the effect of staging is not quite as pronounced: at 2.5 feet per second gas velocity the minimum total inventory requirement is about 88% and at 4.5 feet per second about 84%.

EXAMPLES 3A AND 3B

The conditions, number of stages and the incremental amount of carbon removed from the catalyst are again the same as those of the preceding examples, while the actual carbon concentrations on the catalyst are maintained at still higher levels: 1.05 weight percent carbon on spent catalyst and 0.25 weight percent carbon on regenerated catalyst. Tables 3A and 3B give a summary of the data.

With the particular set of operating conditions employed in these examples, it is seen that there is an upper limit of carbon concentration to which the catalyst can be regenerated by a staged method with beneficial results, e.g. at 2.5 feet per second superficial gas velocity there is a stand-off between staging to remove 83.3% carbon in the first bed versus single-stage regeneration. At other TABLE 2A.—TWO-STAGE REGENERATION OF CRACKING CATALYST WITH 0.9% CARBON DEPOSITS AT 2.5 FEET PER SECOND SUPERFICIAL GAS VELOCITIES

|  | Stage | | Stage | | Stage | | Stage | |
| --- | --- | --- | --- | --- | --- | --- | --- | --- |
|  | First | Second | First | Second | First | Second | First | Second |
| Percent carbon removal in stage | 50.0 | 50.0 | 66.7 | 33.3 | 83.3 | 16.7 | 100.0 | |
| Catalyst flow-rate (excluding deposits) lbs./sec | 1,000 | 1,000 | 1,000 | 1,000 | 1,000 | 1,000 | 1,000 | |
| Catalyst inlet temperature, °F | 950 | 1,100 | 950 | 1,150 | 950 | 1,200 | 950 | |
| Catalyst outlet temperature, °F | 1,100 | 1,250 | 1,150 | 1,250 | 1,200 | 1,250 | 1,250 | |
| Pressure above bed, p.s.i.g | 16.0 | 16.0 | 16.0 | 16.0 | 16.0 | 16.0 | 16.0 | |
| O₂ concentration in gas leaving bed, mole percent | 0.3 | 0.3 | 0.3 | 0.3 | 0.3 | 0.3 | 0.3 | |
| Carbon on catalyst in, wt. percent | 0.90 | 0.50 | 0.90 | 0.37 | 0.90 | 0.23 | 0.90 | |
| Carbon on catalyst out, wt. percent | 0.50 | 0.10 | 0.37 | 0.10 | 0.23 | 0.10 | 0.10 | |
| Inventory basis total inventory, wt. percent | 49.7 | 50.3 | 63.6 | 36.4 | 81.0 | 19.0 | 100.0 | |
| Total catalyst inventory, lbs | 373,200 | | 343,500 | | 329,900 | | 375,300 | |
| Ratio of total inventories, two stage/one stage | 0.99 | | 0.92 | | 0.88 | | 1.00 | |

TABLE 2B.—TWO-STAGE REGENERATION OF CRACKING CATALYST WITH 0.9% CARBON DEPOSITS AT 4.5 FEET PER SECOND SUPERFICIAL GAS VELOCITIES

|  | Stage | | Stage | | Stage | | Stage | |
| --- | --- | --- | --- | --- | --- | --- | --- | --- |
|  | First | Second | First | Second | First | Second | First | Second |
| Percent carbon removal in stage | 50.0 | 50.0 | 66.7 | 33.3 | 83.3 | 16.7 | 100.0 | |
| Catalyst flow-rate (excluding deposits) lbs./sec | 1,000 | 1,000 | 1,000 | 1,000 | 1,000 | 1,000 | 1,000 | |
| Catalyst inlet temperature, °F | 950 | 1,100 | 950 | 1,150 | 950 | 1,200 | 950 | |
| Catalyst outlet temperature, °F | 1,100 | 1,250 | 1,150 | 1,250 | 1,200 | 1,250 | 1,250 | |
| Pressure above bed, p.s.i.g | 16.0 | 16.0 | 16.0 | 16.0 | 16.0 | 16.0 | 16.0 | |
| O₂ concentration in gas leaving bed, mole percent | 0.3 | 0.3 | 0.3 | 0.3 | 0.3 | 0.3 | 0.3 | |
| Carbon on catalyst in, wt. percent | 0.90 | 0.50 | 0.90 | 0.37 | 0.90 | 0.23 | 0.90 | |
| Carbon on catalyst out, wt. percent | 0.50 | 0.10 | 0.37 | 0.10 | 0.23 | 0.10 | 0.10 | |
| Inventory basis total inventory, wt. percent | 51.9 | 48.1 | 63.4 | 36.6 | 80.0 | 20.0 | 100.0 | |
| Total catalyst inventory, lbs | 242,200 | | 211,800 | | 194,300 | | 232,700 | |
| Ratio of total inventories, two stage/one stage | 1.04 | | 0.91 | | 0.84 | | 1.00 | | positions of the baffle, the comparison favors the single-stage regeneration.

At 4.5 feet per second superficial velocity there is no benefit in staging as far as inventory requirements are concerned, and the lowest hold-up is achieved in one-stage operations.

feet percent. The data of this comparative example are shown in Tables 4A and 4B.

These examples demonstrate the further improvements achieved by inclusion of intermediate stages. Each staged operation is conducted at about optimum conditions to render the comparisons meaningful. Again at higher TABLE 3A.—TWO-STAGE REGENERATION OF CRACKING CATALYST WITH 1.05% CARBON DEPOSITS AT 2.5 FEET PER SECOND SUPERFICIAL GAS VELOCITIES

|  | Stage | | Stage | | Stage | | Stage | |
| --- | --- | --- | --- | --- | --- | --- | --- | --- |
|  | First | Second | First | Second | First | Second | First | Second |
| Percent carbon removal in stage | 50.0 | 50.0 | 66.7 | 33.3 | 83.3 | 16.7 | 100.0 | |
| Catalyst flow-rate (excluding deposits) lbs./sec | 1,000 | 1,000 | 1,000 | 1,000 | 1,000 | 1,000 | 1,000 | |
| Catalyst inlet temperature, °F | 950 | 1,100 | 950 | 1,150 | 950 | 1,200 | 950 | |
| Catalyst outlet temperature, °F | 1,100 | 1,250 | 1,150 | 1,250 | 1,200 | 1,250 | 1,250 | |
| Pressure above bed, p.s.i.g | 16.0 | 16.0 | 16.0 | 16.0 | 16.0 | 16.0 | 16.0 | |
| $O_2$ concentration in gas leaving bed, mole percent | 0.3 | 0.3 | 0.3 | 0.3 | 0.3 | 0.3 | 0.3 | |
| Carbon on catalyst in, wt. percent | 1.05 | 0.65 | 1.05 | 0.52 | 1.05 | 0.38 | 1.05 | |
| Carbon on catalyst out, wt. percent | 0.62 | 0.25 | 0.52 | 0.25 | 0.38 | 0.25 | 0.25 | |
| Inventory basis total inventory, wt. percent | 54.1 | 45.9 | 67.6 | 32.4 | 83.2 | 16.8 | 100.0 | |
| Total catalyst inventory, lbs | 299,400 | | 282,400 | | 272,600 | | 274,900 | |
| Ratio of total inventories, two stage/one stage | 1.09 | | 1.03 | | 0.99 | | 1.00 | |

TABLE 3B.—TWO-STAGE REGENERATION OF CRACKING CATALYST WITH 1.05% CARBON DEPOSITS AT 4.5 FEET PER SECOND SUPERFICIAL GAS VELOCITIES

|  | Stage | | Stage | | Stage | | Stage | |
| --- | --- | --- | --- | --- | --- | --- | --- | --- |
|  | First | Second | First | Second | First | Second | First | Second |
| Percent carbon removal in stage | 50.0 | 50.0 | 66.7 | 33.3 | 83.3 | 16.7 | 100.0 | |
| Catalyst flow-rate (excluding deposits) lbs./sec | 1,000 | 1,000 | 1,000 | 1,000 | 1,000 | 1,000 | 1,000 | |
| Catalyst inlet temperature, °F | 950 | 1,100 | 950 | 1,150 | 950 | 1,200 | 950 | |
| Catalyst outlet temperature, °F | 1,100 | 1,250 | 1,150 | 1,250 | 1,200 | 1,250 | 1,250 | |
| Pressure above bed, p.s.i.g | 16.0 | 16.0 | 16.0 | 16.0 | 16.0 | 16.0 | 16.0 | |
| $O_2$ concentration in gas leaving bed, mole percent | 0.3 | 0.3 | 0.3 | 0.3 | 0.3 | 0.3 | 0.3 | |
| Carbon on catalyst in, wt. percent | 1.05 | 0.65 | 1.05 | 0.52 | 1.05 | 0.38 | 1.05 | |
| Carbon on catalyst out, wt. percent | 0.65 | 0.25 | 0.52 | 0.25 | 0.38 | 0.25 | 0.25 | |
| Inventory basis total inventory wt. percent | 61.1 | 38.9 | 70.8 | 29.2 | 83.9 | 16.1 | 100.0 | |
| Total catalyst inventory, lbs | 169,000 | | 151,000 | | 136,200 | | 131,500 | |
| Ratio of total inventories, two stage/one stage | 1.29 | | 1.14 | | 1.04 | | 1.00 | |

EXAMPLES 4A AND 4B

These comparative examples demonstrate the beneficial effect of staging when 1200 pounds per second of spent catalyst having 1.01 weight percent carbon is regenerated in one, two, three, and four stages to a final carbon concentration of the fully regenerated catalyst of 0.05 weight percent. The inlet catalyst temperature is 950° F. and the outlet temperature is maintained at 1250° F. The outlet concentration of oxygen maintained at 0.3 mole percent, and the superficial gas velocities again at 2.5 and 4.5 superficial gas velocities the effects of staging are more pronounced. It is evident that the use of more than three stages in the process will produce only marginal, additional benefits as far as inventory requirements are concerned; however, the time spent at the higher temperatures will be reduced, thereby reducing the overall severity of the process.

Many modifications and alterations of this invention will be apparent to those skilled in the art without departing from the spirit and scope of the present invention which is limited only by the claims.

TABLE 4A.—MULTI-STAGE REGENERATION OF CRACKING CATALYST HAVING 1.01% CARBON DEPOSITS AT 2.5 FEET PER SECOND SUPERFICIAL GAS VELOCITIES

|  | Number of stages | | | | | | | | |
| --- | --- | --- | --- | --- | --- | --- | --- | --- | --- |
|  | 1 | 2 | | 3 | | | 4 | | |
|  | Stage | Stage | | Stage | | | Stage | | |
|  | 1 | 1 | 2 | 1 | 2 | 3 | 1 | 2 | 3 | 4 |
| Catalyst flow-rate, lbs./sec. (excluding deposits) | 1,200 | 1,200 | 1,200 | 1,200 | 1,200 | 1,200 | 1,200 | 1,200 | 1,200 | 1,200 |
| Catalyst inlet temp., °F | 950 | 950 | 1,200 | 950 | 1,175 | 1,225 | 950 | 1,175 | 1,200 | 1,225 |
| Catalyst outlet temp., °F | 1,250 | 1,200 | 1,250 | 1,175 | 1,225 | 1,250 | 1,175 | 1,200 | 1,225 | 1,250 |
| Pressure above bed, p.s.i.g | 16.0 | 16.0 | 16.0 | 16.0 | 16.0 | 16.0 | 16.0 | 16.0 | 16.0 | 16.0 |
| $O_2$ concentration in gas leaving bed, mole percent | 0.3 | 0.3 | 0.3 | 0.3 | 0.3 | 0.3 | 0.3 | 0.3 | 0.3 | 0.3 |
| Carbon on catalyst in, wt. percent | 1.01 | 1.01 | 0.21 | 1.01 | 0.29 | 0.13 | 1.01 | 0.29 | 0.21 | 0.13 |
| Carbon on catalyst out, wt. percent | 0.05 | 0.21 | 0.05 | 0.29 | 0.13 | 0.05 | 0.29 | 0.21 | 0.13 | 0.05 |
| Inventory basis total inventory, wt. percent | 100 | 75 | 25 | 69 | 18 | 13 | 70 | 8 | 9 | 13 |
| Total catalyst inventory, lbs | 785,000 | 533,400 | | 502,500 | | | 498,300 | | | |
| Ratio of total inventories (multi-stage/single stage) | 1.00 | 0.68 | | 0.64 | | | 0.63 | | | |

TABLE 4B.—MULTI-STAGE REGENERATION OF CRACKING CATALYST HAVING 1.01% CARBON DEPOSITS AT 4.5 FEET PER SECOND SUPERFICIAL GAS VELOCITIES

|  | Number of stages | | | | | | | | |
| --- | --- | --- | --- | --- | --- | --- | --- | --- | --- |
|  | 1 | 2 | | 3 | | | 4 | | |
|  | Stage | Stage | | Stage | | | Stage | | |
|  | 1 | 1 | 2 | 1 | 2 | 3 | 1 | 2 | 3 | 4 |
| Catalyst flow-rate, lbs./sec. (excluding deposits) | 1,200 | 1,200 | 1,200 | 1,200 | 1,200 | 1,200 | 1,200 | 1,200 | 1,200 | 1,200 |
| Catalyst inlet temp., °F | 950 | 950 | 1,200 | 950 | 1,175 | 1,225 | 950 | 1,175 | 1,200 | 1,225 |
| Catalyst outlet temp., °F | 1,250 | 1,200 | 1,250 | 1,175 | 1,225 | 1,250 | 1,175 | 1,200 | 1,225 | 1,250 |
| Pressure above bed, p.s.i.g | 16.0 | 16.0 | 16.0 | 16.0 | 16.0 | 16.0 | 16.0 | 16.0 | 16.0 | 16.0 |
| $O_2$ concentration in gas leaving bed, mole percent | 0.3 | 0.3 | 0.3 | 0.3 | 0.3 | 0.3 | 0.3 | 0.3 | 0.3 | 0.3 |
| Carbon on catalyst in, wt. percent | 1.01 | 1.01 | 0.21 | 1.01 | 0.29 | 0.13 | 1.01 | 0.29 | 0.21 | 0.13 |
| Carbon on catalyst out, wt. percent | 0.05 | 0.21 | 0.05 | 0.29 | 0.13 | 0.05 | 0.29 | 0.21 | 0.13 | 0.05 |
| Inventory basis total inventory, wt. percent | 100 | 71 | 29 | 66 | 18 | 16 | 67 | 8 | 9 | 16 |
| Total catalyst inventory, lbs | 578,500 | 336,900 | | 310,800 | | | 306,600 | | | |
| Ratio of total inventory (multi-stage/single stage) | 1.00 | 0.58 | | 0.54 | | | 0.53 | | | |

What is claimed is:

1. In a process for the regeneration of spent molecular sieve types hydrocarbon conversion catalyst having carbonaceous material deposited thereon to produce regenerated catalyst of low carbon concentration, the improvement which comprises:

maintaining in the lower portion of a combustion zone at least two separated dense beds of fluidized particulate material and a common dilute phase superimposed thereabove;

continuously introducing such spent hydrocarbon conversion catalyst at an elevated inlet temperature to a first one of said beds;

contacting in said first bed such spent hydrocarbon conversion catalyst with a first oxygen-containing gas stream taken from the group consisting of air, oxygen and oxygen-enriched air under conditions to remove by combustion a major portion of said carbonaceous deposits from the spent hydrocarbon conversion catalyst thereby producing a partially regenerated catalyst, said major portion amounting to at least 65 percent of the total removal in the process, said conditions including a temperature at least about 1100° F.;

continuously introducing partially regenerated catalyst from said first bed to a second such bed;

contacting in said second bed the partially regenerated catalyst with a second oxygen-containing gas stream taken from the group consisting of air, oxygen and oxygen-enriched air under conditions to remove by combustion a further portion of said carbonaceous deposits to a carbon concentration of the catalyst of less than about 0.25 weight percent, said conditions including a temperoture between about 1125° F. and about 1350° F. and above the temperature of the first bed;

maintaining the oxygen content of the flue gases resulting from the combustion of carbonaceous material in said combustion zone between about 0.1 and about 1.0 mole percent.

2. A process according to claim 1 wherein superficial gas velocities are maintained in the range of about 1.25 to 6 feet per second in the lower portion of the combustion zone.

3. A process according to claim 1, in which a regenerated catalyst of less than about 0.10 weight percent carbon concentration is produced in said second bed.

4. A process according to claim 1, in which the major portion of said carbonaceous deposits is removed in the first bed at a temperature between about 1100° F. and about 1275° F. and the further portion of said carbonaceous deposits is removed in the second bed at a temperature ranging from about 1150° F. and about 1325° F.

5. A process according to claim 1, in which partially regenerated catalyst from the first bed prior to its introduction to the second bed is further contacted in at least one intermediate fluidized bed of particulate material with an intermediate oxygen-containing gas stream taken from the group consisting of air, oxygen and oxygen-enriched air under conditions to promote combustion of carbonaceus deposits, said conditions including a temperature intermediate to those of the first bed and the second bed.

References Cited

UNITED STATES PATENTS

| | | | |
|---|---|---|---|
| 2,265,964 | 12/1941 | Carpenter | 252—419 |
| 2,398,739 | 4/1946 | Greensfelder et al. | 252—417 |
| 2,419,245 | 4/1947 | Arveson | 252—417 |
| 2,449,622 | 9/1948 | Roetheli | 252—417 |
| 2,698,281 | 12/1954 | Leffer | 252—417 |
| 2,829,955 | 4/1958 | Goedkoop | 252—417 |
| 3,236,607 | 2/1966 | Porter, Jr. et al. | 252—417 |
| 3,351,548 | 11/1967 | Payne et al. | 208—46 |

DANIEL E. WYMAN, Primary Examiner

P. E. KONOPKA, Assistant Examiner

U.S. Cl. X.R.

23—288; 252—419